United States Patent [19]

Schmidt et al.

[11] 4,021,517

[45] May 3, 1977

[54] METHOD OF PRODUCING HOLLOW ARTICLES OF PLASTICS MATERIAL

[75] Inventors: Jurgen Schmidt, Herborn; Jurgen Hesse, Dusseldorf, both of Germany

[73] Assignee: Messer Griesheim GmbH, Frankfurt am Main, Germany

[22] Filed: Sept. 4, 1975

[21] Appl. No.: 610,316

[30] Foreign Application Priority Data

Sept. 4, 1974 Germany .......................... 2442254

[52] U.S. Cl. .................................. 264/85; 264/89; 264/98
[51] Int. Cl.² .................. B29C 17/07; B29C 25/00
[58] Field of Search ................. 264/89, 90, 92, 93, 264/94, 96–99, 28, 85; 425/DIG. 208

[56] References Cited

UNITED STATES PATENTS

| 3,520,020 | 7/1970 | Williams et al. ................. 264/94 X |
| 3,819,317 | 6/1974 | Higginbotham .......... 425/DIG. 208 |

FOREIGN PATENTS OR APPLICATIONS 2,223,580  11/1973  Germany

*Primary Examiner*—Jan H. Silbaugh
*Attorney, Agent, or Firm*—Connolly and Hutz

[57] ABSTRACT

A method of producing hollow articles of plastic material by blow molding is characterized by blowing compressed air into the preform at the beginning of the admission phase to intensify the inflation operation and its admission is interrupted before the final blow pressure is reached.

5 Claims, No Drawings

METHOD OF PRODUCING HOLLOW ARTICLES OF PLASTICS MATERIAL

BACKGROUND OF THE INVENTION

The invention relates to a method producing hollow articles of plastics material by blow molding according to German Patent 22,23,580, hereafter called "Main Application".

By the method of the Main Application a preform is expanded and cooled in a blow mold by means of a liquefied gas at low temperature. At the beginning of the working cycle of the machine the liquefied gas, by which nitrogen is principally meant, flows through the warm pipe and the warm blow mandrel thus being vaporized. The vaporized gas at low temperature serves to inflate the preform. In the further course of the admission phase the pipe and the blow mandrel are also decreasingly cooled, so that increasingly less liquefied gas is vaporized. A mixture of gas and liquid and finally pure liquid mist passes into the preform. The liquid mist evaporates through contact with the warm preform. The vaporized gas escapes during the flushing phase, in which liquid nitrogen is also simultaneously sprayed in.

The advantage of this method is that with a single medium at low temperature the hollow article is inflated and cooled in a single working cycle. The previous division into a separate blowing phase with a medium at ambient temperatures and a separate, later cooling phase with a medium at low temperature is eliminated, because the blow phase merges continuously into the cooling phase.

The working cycle of the machine is thus appreciably shortened and the capacity of the machine is thus increased. Only one medium has to be controlled. Particularly in the case of smaller hollow articles, for which the cycle times are correspondingly short, the additional advantage of a considerable simplification of the installation is achieved.

In the case of large hollow articles the specific consumption of nitrogen decreases. This may assume such proportions that more nitrogen is required for inflation than for cooling. Furthermore, it may occur that the heat content of the nitrogen pipe and of the blow mandrel will then no longer suffice to vaporize sufficient liquid nitrogen. It is therefore proposed in the Main Application that in such cases the blow mandrel or the nitrogen pipe should be provided with an additional heating system.

Although large hollow articles of plastics materials can be produced faultlessly in this manner, in some cases it is unsatisfactory to vaporize valuable liquid nitrogen solely for the purpose of providing sufficient gas to inflate the hollow articles.

SUMMARY OF THE INVENTION

The present invention therefore seeks to provide a modification of the methods utilizing additional heating, whereby the advantages of blowing and cooling with one medium are substantially retained, but the vaporization of liquid nitrogen in excess of the amount required for cooling is limited or entirely avoided.

In a method of producing hollow articles of plastics material by blow molding, wherein a preform is expanded in a blow mold by means of a liquefied gas at low temperature and the article is cooled and wherein the gas flows into the preform through a single pipe, which is provided with a valve controlled in unison with the working cycle of the machine, and through a blow mandrel in such a manner that at the beginning of the admission phase the gas drawn off in liquefied form from a reservoir held under pressure passes out of the blow mandrel after vaporization by the warm pipe and the warm blow mandrel and expands the preform, while in the further course of the admission phase the gas flows into the preform in only partly vaporized form because of the cooling of the pipe and blow mandrel and finally, at the end of the admission phase passes into the preform in the liquid state, this aim can be achieved according to the invention by additionally blowing compressed air into the preform at the beginning of the admission phase in order to intensify the inflation operation, the introduction of compressed air being interrupted before the final blowing pressure is reached.

In order to retain the advantage of the method of the Main Application, namely the fact that the gas used for inflating already has a low temperature and towards the end of the blowing operation continuously approaches the temperature of the liquid gas, the supply of compressed air at room temperature must be terminated before the final blowing pressure is reached. It is expedient for the introduction of compressed air to be stopped at the latest when 80% of the final blowing pressure has been reached.

For the same reason, the amount of compressed air must also not be too great. The blowing medium remains sufficiently cool if the amount of compressed air does not exceed 25% of the amount of gas required for inflation.

The admission of compressed air must also be controlled in time with the working cycle of the machine. This, however, is not a disadvantage. Since the method of the invention is intended particularly for large hollow articles, with the long cycle times necessary for these hollow articles no difficulty is encountered in also controlling a second medium. Furthermore, if additional heating were employed this would also have to be controlled in time with the working cycle of the machine. It may be observed at this point that the introduction of compressed air according to the invention can be regarded as special additional heating, this heating being effected by means of a heat carrier which is also injected into the hollow body.

The compressed air may be supplied through the pipe for the liquefied gas, which is usually nitrogen. If only excessively rapid cooling of the blow mandrel has to be avoided, while no attention need be paid to the temperature behavior of the admission pipe, the compressed air may also be introduced through a separate duct in the blow mandrel. In the case of large hollow articles this presents no difficulty since for hollow articles of this kind the low mandrel is also of corresponding dimensions. In order to achieve good, uniform heat transfer the compressed air is in this case expediently guided in an annular duct.

DETAILED DESCRIPTION

The following example relates to the production of a polyethylene bottle of a capacity of 5 liters and a weight of 200 g by the method of the invention. The liquefied gas used is nitrogen.

The operation is carried out with a blow pressure of 9 atmospheres gauge. At the commencement of the inflation the extruded tube already has a volume of about 2 liters. According to the invention, during the blowing operation compressed air is introduced additionally to the nitrogen until an internal pressure in the container of 6 atmospheres gauge is achieved. The admission of compressed air is therefore terminated after 66.7% of the final blowing pressure has been reached. This is achieved by means of a non-return valve set to 6 atmospheres gauge.

This results in a nitrogen consumption of 84 g of $N_2$ per bottle. This corresponds to a specific nitrogen consumption of 0.42 kg of $N_2$/kg of PE. Converted to normal volume (specific gravity of $N_2$ = 1.25 kp/Nm$^3$), a consumption of 66 Nl of $N_2$ per bottle is obtained.

In a comparative test working solely with nitrogen it was found that a total of 48 Nl of gas was required for the inflation, while for the subsequent flushing and cooling 25.5 Nl of nitrogen were required. These values are not changed when compressed air is used, so that a total of 66-25.5 = 40.5 Nl of $N_2$ is required for inflating the bottle. The difference between 48 Nl and 40.5 Nl, that is to say 7.5 Ne, is the proportion of compressed air. It thus amounts to 15.6% of the total amount of gas required for inflation.

For the comparison test the following values may also be indicated:

92 g $N_2$ per bottle
= 0.46 kg $N_2$/kg PE
= 73.5 Nl per bottle.

With a blowing pressure of 9 atmospheres gauge and the volume of 2 liters already existing in the extruded tube, it is found that a total of 48 Nl of nitrogen is required for inflation, whereas the remainder, 25.5 Nl of nitrogen, is required for flushing.

From these values the consolute temperature of the volume of compressed air and nitrogen introduced can also readily be determined.

For inflation to 6 atmospheres gauge, that is to say until the admission of compressed air is ended, a total of (6+1) . 5 − 2 = 33 Nl of gas is required, comprising 7.5 Nl of compressed air at 293° K and 25.5 Nl of nitrogen at 83° K. The specific heat of air and nitrogen can be regarded as being equal, and accordingly for the consolute temperature T the following is obtained:

7.5 Nl . 293° K + 25.5 Nl . 83° K = 33 Nl.T °K

T = 130° K = − 143° C

The mean consolute temperature during the inflation operation therefore amounts to −143° C, the basis adopted being that only the gas heat of the nitrogen introduced serves to cool the compressed air, while the heat of evaporation is used to cool the nitrogen supply pipe, the blow mandrel and the preform.

The preform is accordingly inflated with a very cold gas, which however at first still contains no proportion of liquefied gas. A shock action is thus avoided. Only when the preform has reached its final shape is liquefied gas also introduced into the hollow article in an ever increasing proportion. Through the continuous transition from evaporated gas to liquefied gas during the admission, very rapid cooling and a considerable shortening of the cycle time are achieved, so that in the meantime considerably more hollow articles can be produced than by hitherto customary methods.

What is claimed is:

1. In a method of producing hollow articles of plastic material by blow molding, wherein a preform is expanded in a blow mold by means of a liquefied gas at low temperature and the article is cooled, and wherein the gas flows into the preform through a single pipe, which is provided with a valve controlled in time with the working cycle of the machine, and through a blow mandrel in such a manner that at the beginning of the admission phase the gas drawn off in liquefied form from a reservoir held under pressure is vaporized by the warm pipe and the warm blow mandrel, passes out of the blow mandrel in gas form and expands the preform, during the further course of the admission phase the gas is only partly vaporized because of the cooling of the pipe and of the blow mandrel, and finally at the end of the admission phase it flows into the preform in the liquid state, characterized in that compressed air is additionally blown into the preform at the beginning of the admission phase in order to intensify the inflation operation and its admission is interrupted before the final blow pressure is reached, and the compressed air comprising a minor amount of the gas required for inflation with the compressed air thereby supporting the liquefied gas which performs the major portion of the inflation operation and the compressed air performing this supporting operation from the beginning of the blowing process until a predetermined pressure is reached before the final blow pressure is reached.

2. A method according to claim 1, characterized in that the admission of compressed air is ended at the latest after reaching 80% of the final blow pressure.

3. A method according to claim 2, characterized in that the amount of compressed air does not exceed 25% of the amount of gas required for inflation.

4. A method according to claim 1, characterized in that the amount of compressed air does not exceed 25% of the amount of gas required for inflation.

5. A method according to claim 1, characterized in that the liquefied gas is nitrogen.

* * * * *